United States Patent [19]
Walter et al.

[11] 4,012,635
[45] Mar. 15, 1977

[54] LIGHT BARRIER SYSTEM

[75] Inventors: Arthur Walter, Denzlingen; Jürgen Erdmann, Buchholz both of Germany

[73] Assignee: Erwin Sick Optik-Electronik, Waldkirch, Germany

[22] Filed: Aug. 13, 1975

[21] Appl. No.: 604,215

[30] Foreign Application Priority Data
Oct. 24, 1974 Germany .......................... 2450648

[52] U.S. Cl. ............................. 250/221; 340/258 B
[51] Int. Cl.² ........................................ G01D 21/04
[58] Field of Search .......................... 250/221, 222; 340/258 B; 343/5 PD; 315/241 R, 241 S

[56] References Cited
UNITED STATES PATENTS

| | | | |
|---|---|---|---|
| 3,605,082 | 9/1971 | Matthews | 340/258 B |
| 3,711,846 | 1/1973 | Schlisser et al. | 250/221 |
| 3,723,737 | 3/1973 | Zeldman et al. | 250/221 |
| 3,859,647 | 1/1975 | Ross | 340/258 B |
| 3,898,588 | 8/1975 | Skagerlund | 315/241 R |
| 3,914,753 | 10/1975 | Cho | 250/221 |

Primary Examiner—David C. Nelms

[57] ABSTRACT

A light barrier system is provided which includes a light transmitter, a light receiver to receive the light beam transmitted over a predetermined path, an indicator unit which is connected to the light receiver and produces a signal when an obstacle is detected in the path, and a power unit supplying the light transmitter, light receiver and indicator unit. The power unit consists essentially only of a rectifier. A pulsed light source is employed, operated by the discharge of a capacitor in the rectifier output.

17 Claims, 4 Drawing Figures

LIGHT BARRIER SYSTEM

The invention relates to a light barrier consisting of a light transmitter, a light receiver receiving the light beam transmitted over a measurement path by the light transmitter, an indicator unit which is connected to the light receiver and transmits a signal when an obstacle is detected in the measurement path, and a power unit supplying the light transmitter, light receiver, and indicator unit.

The invention relates more particularly to light barriers working on the autocollimation principle, such as are described for example in DT PS No. 952,155. The invention can be applied with particular advantage to light barriers which contain a light transmitter (lamp), light receiver, all the associated optical and electronic parts, as well as relays and a power unit consisting of a mains transformer, rectifier, and charging capacitator.

The disadvantage of known light barriers of this kind consists in that they usually require transformers for their operation, which as the result of the high cost of wages for the production of transformers and the increasing price of copper leads to higher manufacturing costs. On the other hand, electronic components are continually becoming cheaper.

The aim of the invention thus consists in providing a light barrier of the kind first mentioned above in which through the preferential use of inexpensive electronic components and the elimination of the use of circuit components entailing heavy expense for wages and materials an economic method of production is achieved, without any sacrifice of simplicity and ease of use or of operational reliability.

In order to solve this problem the invention provides for the power unit to consist essentially only of a rectifier. In particular, the use of a transformer is completely eliminated. In conjunction with the rectifier use is made at most of interference suppression and smoothing elements.

It is particularly advantageous to use in the light transmitter a pulsed light source, particularly a light-emitting diode, which is preferably a GaAs diode. This pulsed light source is preferably operated periodically by a discharging capacitor which is incorporated in the output circuit of the rectifier and is charged in the intervals between illuminating pulses of the pulsed light source. The basic principle of the invention is therefore to be seen in that the capacitor is charged by the mains voltage, which is simply rectified but not stepped down by a transformer, the charging operation being broken off at the moment when the voltage desired for operating the pulsed light source is obtained in the capacitor. The use of a pulsed light source in conjunction with a periodically charged capacitor thus makes it possible to step down from the mains voltage to as low a value as is desired, without using a transformer. The electronic circuit components required to achieve this action are inexpensive and can also be arranged in a simple manner in the smallest space, so that an economical method of production of the light barrier of the invention is ensured, particularly in the case of an autocollimation light barrier in which the transmitter and the receiver are disposed in a single housing.

As is well known, in autocollimation light barriers of this kind the light is returned at the end of the measurement path by means of a reflector disposed there.

In carrying out the invention the important point is therefore that the capacitor is charged to a substantially lower voltage than the mains voltage and then discharged through the pulsed light source. The maximum charging voltage of the capacitor preferably mounts to from 25 to 35 volts.

The capacitor is expediently connected to the rectifier by way of a charging resistor, the time during which the capacitor is charged to the desired voltage level being determined by the value of this resistor. The capacitor expediently has a capacity of from $0.2\mu F$ to $0.8\mu F$ and the charging resistor a resistance value of from 30 to 80 k-ohms.

The pulsed light source, connected in series with a thyristor, is expediently connected in parallel to the capacitor and to an inductance coil, which is preferably connected in series with the capacitor. The thyristor is preferably controlled by the voltage present in the capacitor. As the result of this arrangement the pulsed light source is disconnected from the supply voltage during the charging of the capacitor. At the moment when the thyristor is fired, the supply voltage is connected to the pulsed light source and causes the latter to light up. The pulsed light source is then extinguished only at the moment when the current falls below the minimum holding current of the thyristor.

The inductance coil, which is expediently connected in series with the capacitor, serves the purpose of increasing the duration of the discharge operation of the capacitor, so that longer pulses are obtained for operating the pulsed light source.

A particularly convenient practical embodiment is characterised in that a circuit in parallel with the capacitor contains a trigger diode which is connected to the control electrode of the thyristor in such a manner that the thyristor switches through on the ignition of the trigger diode. A diac is conveniently connected as trigger diode between the anode and control electrode. The control electrode is preferably connected via a resistor to the anode of the pulsed light source. As soon as a voltage sufficient to fire the diac is available in the capacitor, the thyristor is switched through and a current feeding the pulsed light source flows until it falls below the holding current of the thyristor and the flow of current through the latter is interrupted. At this moment the charging of the capacitor starts again and the entire operation is repeated periodically.

In another advantageous embodiment provision is made for the light receiver, which consists of a photoelectric transducer and a pulse amplifier, to be connected to the rectifier in series with the series resistor and with the light pulse generator containing the pulsed light source. A Zener diode is conveniently connected in parallel to the pulse amplifier. As the result of this arrangement the light receiver is also fed with a relatively low, and in addition still constant, voltage without a transformer being necessary to lower the voltage. This problem is solved solely by the convenient connection of the pulse amplifier and the provision of a Zener diode, that is to say, in a very simple and uncomplicated manner.

For the purpose of pulse rectifying, use is conveniently made of a sawtooth generator which is controlled by the output pulses of the light receiver and connected to the indicator unit and whose maximum voltage in normal operation has a value which is not sufficient to actuate the indicator unit, but exceeds this value as soon as the pulse level falls below a predetermined value because of an obstacle in the measurement path. The sawtooth generator preferably has a thyristor which is connected to the rectifier in series with a resistor and whose control electrode is connected, optionally by way of a capacitor, to the output of the pulse amplifier, and also a capacitor connected in parallel with the thyristor. This pulse detector circuit arrangement is also particularly suitable for direct feeding with the relatively high output voltage of the rectifier forming the power unit.

The maximum voltage of the sawtooth generator advantageously controls a transistor serving as voltage detector.

In a particularly advantageous embodiment a resistor is connected between the sawtooth capacitor and the point of connection on the cathode side to the sawtooth thyristor. In this case the point of connection of the capacitor and resistor is preferably connected through another resistor to the control electrode of the thyristor. In addition, provision is advantageously made for a rectifier diode to be inserted in the direct sense between the Zener diode and the rectifier, the thyristor being connected to the point of connection between the Zener diode and the rectifier diode and the resistor direct to the rectifier. The rectifier diode has the effect that the control electrode of the thyristor thus has a negative bias. The resistor inserted has the effect that when a charging current flows through the capacitor a voltage drop exists which partly cancels out this negative bias. In this way the circuit is advantageously given a hysteresis, which has the consequence that perfect switching behavior is ensured.

In another embodiment the indicator elements of the indicator unit are connected to the rectifier by way of a transistor controlled by the light receiver. Thus, the indicator unit is also actuated directly by the relatively high direct current voltage at the output of the rectifier.

The invention is described below by way of example with reference to the accompanying drawings, in which.

Figure 1:
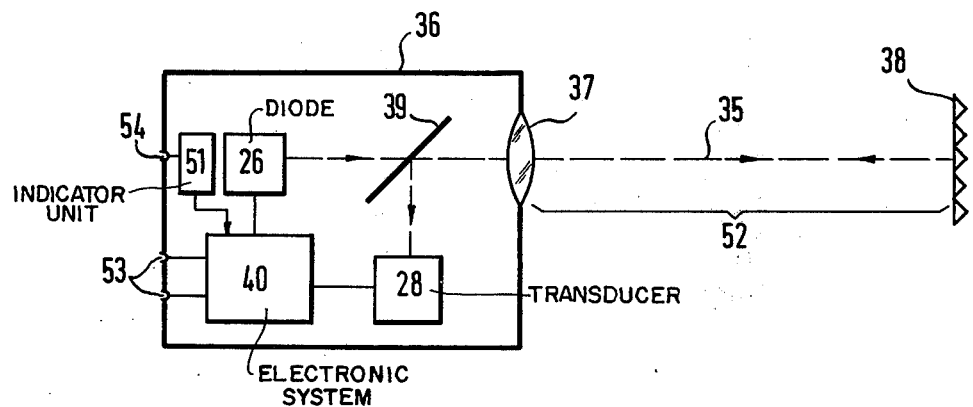
FIG. 1 is a diagrammatical block representation of an autocollimation light barrier according to the invention, with a reflector disposed at a distance.

According to FIG. 1, a GaAs diode 26 acting as light transmitter and a photoelectric transducer 28 are disposed in a casing 36 having an exit lens 37.

The pulsed light produced in the GaAs diode 26 by an electronic system 40 which will be described in detail further below is directed by a splitting mirror 39 and the exit lens 37 on to a reflector 38 which is disposed a certain distance away and which is preferably made of retro-reflective material and in particular is in the form of a so-called triple mirror.

The light beam, shown as a dashed line, is reflected into itself by the reflector 38 and is thrown by way of the same lens 37 and the splitting mirror 39 onto the photo-electric transducer 28 disposed at an angle of 90° in relation to the light beam. The electric signal thus produced in the photo-electric transducer is likewise processed in the electronic system 40 in a manner which will be described below. The measurement path 52 is situated between the casing 36 and the reflector 38. The aim of the light barrier is to produce an electric signal in the event of an obstacle appearing in the measurement path 52.

By means of the sockets 53 the light barrier of the invention is fed with a mains AC voltage of for example 220 or 110V.

If an obstacle should appear in the measurement path 52, the electronic signal 40 will transmit to an indicator unit 51 a signal, which can also be taken off on the outside by means of a socket 54.

Figure 2:
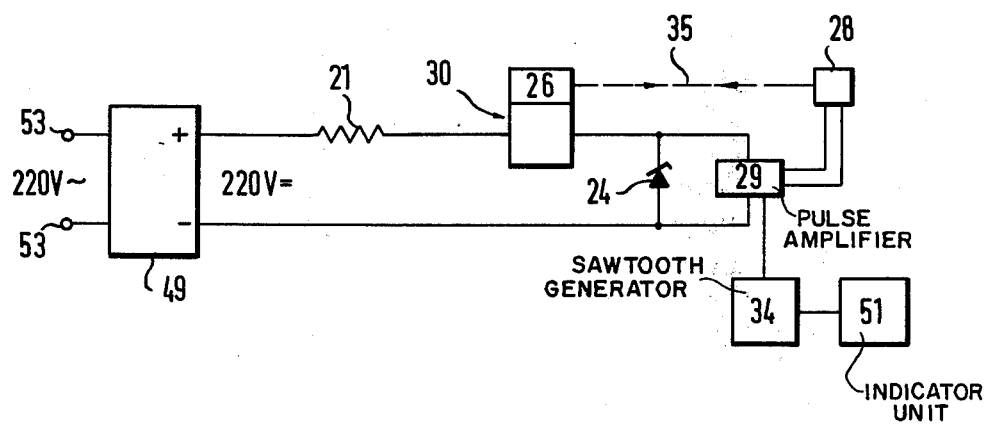
FIG. 2 is a block diagram of a light barrier according to the invention.

The block circuit diagram in FIG. 2 shows further details of, in particular, the electronic system 40 of the light barrier of FIG. 1.

To the sockets 53, which receive alternating current, there is first connected to a power unit 49, which according to the invention consists solely of a rectifier and optionally of interference suppression and smoothing elements, so that a direct current voltage of approximately equal magnitude is produced at the output. This voltage is applied by way of a charging resistor 21 and a light pulse generator 30, which will be further described below, to the pulse amplifier 29, which receives the input signal from the photo-electric transducer 28. FIG. 2 also diagrammatically indicates the light beam 35 which extends between the pulsed light source 26 and the transducer 28.

A Zener diode 24 is connected in parallel to the pulse amplifier 29, so that a constant voltage dependent on the nature of the Zener diode 24 is obtained in the amplifier 29.

The light pulse generator 30 contains the pulsed light source, which is in the form of a GaAs diode, while a pulse level detector, preferably in the form of a sawtooth generator, and the indicator unit, are connected to the pulse amplifier 29.

Figure 3:
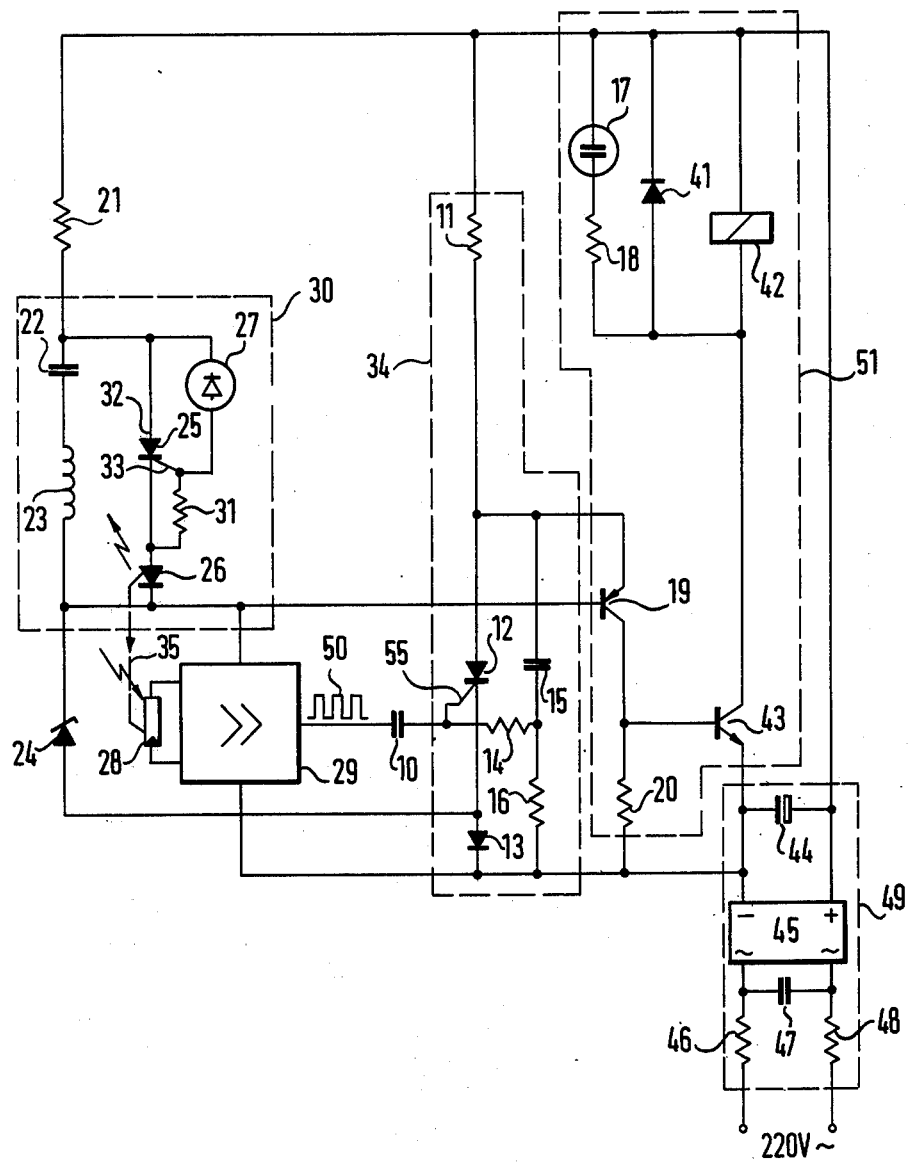
FIG. 3 is a circuit diagram in greater detail of a light barrier according to the invention.

According to FIG. 3 the power unit 49 has as an essential component a rectifier 45, while two series arm resistors 46 and 48 are inserted in the input lines. The two input terminals of the rectifier 45 are connected together through a suppressor capacitor 47. A smoothing capacitor 44 is provided between the output terminals of the rectifier 45.

According to FIG. 3, the light pulse generator 30 consists of a capacitor 22, which is connected to the charging resistor 21 in series with an inductance coil 23, and of an arrangement consisting of a thyristor 25 and GaAs diode 26 connected in series to one another, this arrangement being connected in parallel to the elements 22, 23. A trigger diode (diac) 27 is connected between the anode 32 and the control electrode 33 of the thyristor 25, while in addition the cathode of the thyristor 25 is connected via a resistor 31 to the control electrode 33.

The series arrangement consisting of the resistor 21 and the light pulse generator 30 forms the current limiting resistor for the Zener diode 24, to which a constant direct current voltage is applied, this voltage supplying the operating voltage for the pulse amplifier 29 belonging to the light receiver. A special feature of the pulse amplifier 29 is its very low current input. It amplifies the pulses supplied by the photo-electric transducer 28 and produced on the basis of the light pulses emitted by the pulsed light source 26.

Because of the connection of the capacitor 22 to the rectifier 45 via the switch elements shown in the drawing, the capacitor 22 is charge by a current, which is limited particularly by the resistor 21, until the breakdown voltage of the diac 27 is reached. At this moment the thyristor 25 is fired, so that the capacitor 22 can discharge by way of the GaAs diode 26 and the inductance coil 23. The inclusion of the inductance coil 23 serves the purpose of limiting the discharge current to the desired value and maintaining the flow of current for a desired time. As the result of the discharge operation the energy temporarily stored in the capacitor 22 is released and the pulsed light source 26 lights up for a predetermined time.

The inductance coil 23 thus has the effect that an adequate pulse time for operating the GaAs diode 36 is already possible with a smaller capacitor 22 or with a smaller charge stored in the capacitor 22.

After extensive discharge of the capacitor 22 the current falls below the holding current of the thyristor 25 and the capacitor 22 is recharged by way of the resistor 21. The cycle of operations described is now repeated periodically.

The pulse frequency is determined by the resistance of the resistor 21 and the capacitance of the capacitor 22. A variation of the operating voltage brings about a practically linear variation of the transmission pulse frequency. The pulsed light power of the GaAs diode 26 nevertheless remains constant because the capacitor 22 is always charged up to the breakdown voltage of the diac 27 independently of the operating voltage.

It is essential that the operating voltage of all the units would be very much higher than the voltage falling via the Zener diode and the generator unit 30, in order that the current through the resistor 21 will vary only to a negligible extent during the charging and discharging of the capacitor 22.

As the result of the construction of the light pulse generator according to the invention it is possible to obtain the low voltage required for operating the GaAs diode with a relatively high direct current voltage of for example 220 V, without resorting to a transformer.

The light pulses passing over the light path 35 to the photo-electric transducer 28 produce at the output of the pulse amplifier 29 light pulses 50 which by way of a coupling capacitor 10 energise a thyristor 12 belonging to the sawtooth generator 34. The capacitor 10 is connected to the control electrode 55 of the thyristor 12.

The cathode of the thyristor 12 is connected to the pole of the Zener diode 24 on the rectifier side and by way of another rectifier diode 13, which is poled in the direct direction, is connected to the negative pole of the rectifier 45. The anode of the thyristor 12 is connected by way of a resistor 11 to the positive pole of the rectifier 45 and direct to a capacitor 15, whose other pole is connected via a resistor 14 to the control electrode 55 of the thyristor 12 and via a resistor 16 to the negative pole of the rectifier 45. In addition, the anode of the thyristor 12 is connected to the emitter of a transistor 19 whose base is connected to the connection point between the light pulse generator 30 and the Zener diode 24, while its collector is connected via a resistor 20 to the negative pole of the rectifier 45. The transistor 19 already forms a component of the indicator unit 51.

The collector of the transistor 19 is connected to the base of a relay driving transistor 43, of which the emitter is connected to the negative pole of the rectifier 45 and the collector is connected by way of a relay 42 or of a glow lamp 17 with series resistor 18 to the positive pole of the rectifier 45. A free running diode 41 is connected to the series resistor 18 in parallel to the glow lamp 17.

Figure 4:
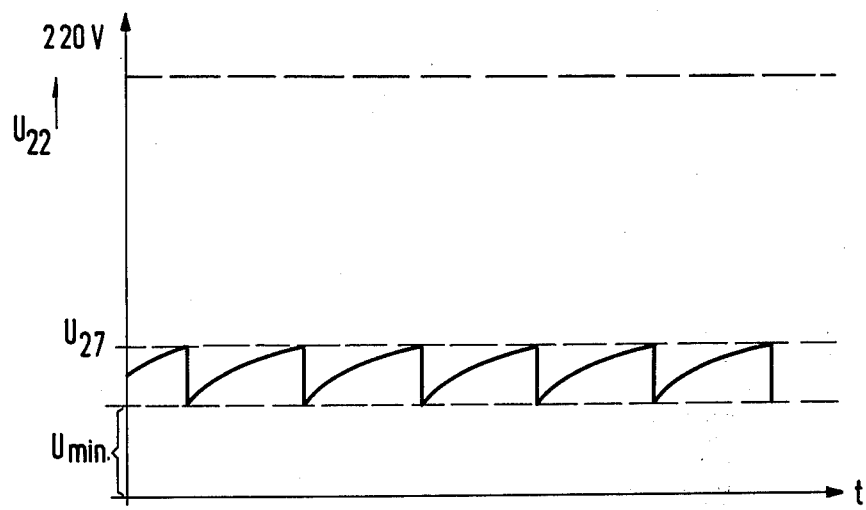
FIG. 4 shows various voltage-time diagrams illustrating the mode of operation of individual switch stages of the light barrier shown in FIGS. 2 and 3.
Figure 4:
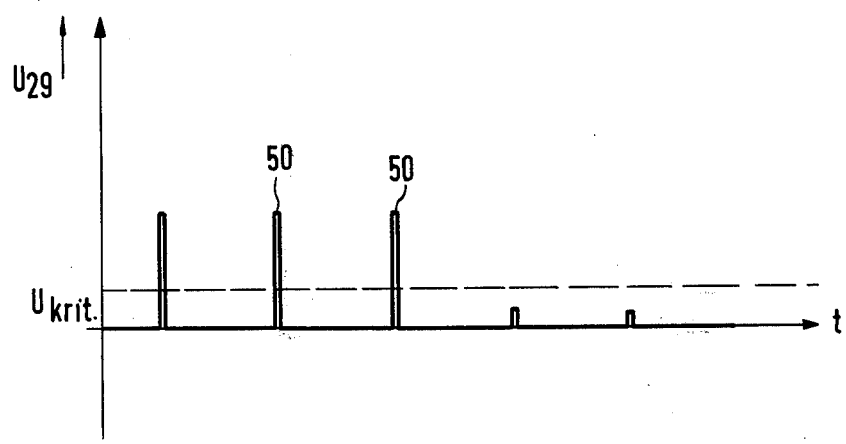
Figure 4:
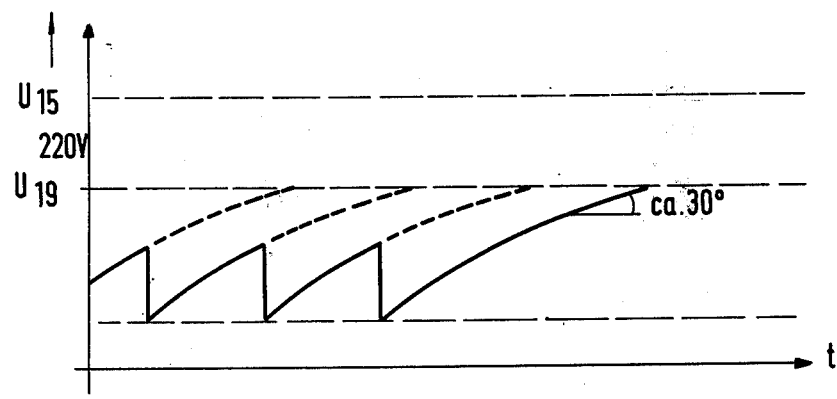

The mode of working and operation of the circuit arrangement and particularly of the saw tooth generator 34 can be seen particularly clearly from the diagrams in FIG. 4. In the top diagram is first shown the voltage $U_{22}$ in the capacitor 22, which voltage fluctuates between a minimum value caused by the holding current of the thyristor 25 and the maximum value $U_{27}$ determined by the diac 27.

During the discharge phases of the capacitor 22 light pulses are thus produced by the GaAs diode 26 and are received by the photo-electric transducer 28, so that at the outlet of the pulse amplifier 29 pulses 50 are received, which are shown in the middle diagram in FIG. 4. As soon as an obstacle appears in the measurement path 52 and thus the pulses 50 fall below a critical value $U_{crit}$ (in the middle diagram in FIG. 4 two such low pulses are indicated diagrammatically on the right), the indicator unit 51 should produce an output signal.

In the particularly preferred circuit arrangement shown in FIG. 3 this is ensured by the sawtooth generator 34, whose mode of operation is illustrated in the bottom diagram in FIG. 4. The individual pulses 50 effect in each case a switching-through of the thyristor 12, so that the capacitor 15 discharges by way of the thyristor 12, the rectifier 13, and the resistor 16 until current falls below the holding current of the thyristor 12. As soon as the flow of current through the thyristor 12 is interrupted, the capacitor 15 can be charged again by way of the resistors 11 and 16. This cycle proceeds continuously, so that at the anode of the thyristor 12 and in the capacitor 15 a sawtooth voltage is produced.

Through suitable dimensioning of the various switch elements this sawtooth voltage is however restricted in respect of its maximum value in such a manner that the base voltage which is necessary for opening the transistor 19 (and which is equal to the operating voltage of the amplifier 29) is normally not reached. The transistor 19 working in a base circuit configuration is thus normally not operated.

As soon as the light beam 35 from the GaAs diode 26 to the photo-electric transducer 28 is interrupted, the rhythmical operation of the thyristor 12 ceases because the pulses 50 have fallen below the critical value. The capacitor 15 can now be charged to a higher voltage, as illustrated on the right in the bottom diagram in FIG. 4. The voltage now exceeds the value $U_{19}$ which is critical for the opening of the transistor, so that the transistor 19 becomes conductive. The relay driving transistor 43 is connected on the output side of the transistor 19 and is now likewise opened, thus energising the relay 42 or the glow lamp 17. In this arrangment the free running diode 41 has the effect that the induction voltage occurring on the disconnection of the relay is short-circuited.

The rectifier diode 13 connected in series with the Zener diode 24 has the effect that the control electrode 55 of the thyristor 12 is negatively biased. When however the charging current flows through the capacitor 15, the latter will bring about in the resistor 16 a voltage drop which partly cancels the negative bias of the thyristor 12. In this way the circuit is given a hysteresis which is responsible for a faultless switching operation.

The variation of the pulse frequency of the transmission generator resulting from a variation of the operating voltage is not critical, since the charging time varies simultaneously and also approximately linearly with the mains voltage, with the time constant of the RC network (resistor 11 and capacitor 15) remaining unchanged. Thus with rhythmic discharge of the capacitor 15 the maximum level of the sawtooth voltage remains constant. All in all, a pulse rectification is thus effected.

The variation of the transmission generator frequency is likewise not critical, since this frequency is substantially higher than the switching frequency of the light barrier which is determined by the relay 22.

It can therefore be seen that a circuit arrangement for a very efficient light barrier is produced at extremely low cost, while it should particularly be observed that even a wide range of variation of the supply voltage is also tolerated without sacrifice of power.

The essential advantage of the light barrier of the invention is however that a relatively high direct current voltage, produced solely by rectification, can be used as operating voltage for the light barrier.

What is claimed is:

1. A light barrier system comprising a pulsed light source, a light receiver comprising a photo-electric transducer and a pulse amplifier and adapted to receive the light beam transmitted by said pulsed light source over a predetermined path, an indicator unit connected to said light receiver for producing a signal when an obstacle is detected in said path, a rectifier fed by a supply voltage and having an output circuit, for supplying the light source, light receiver and indicator unit, a discharging capacitor in said output circuit of said rectifier and connected to said pulsed light source for periodically operating the same, said capacitor being charged in the intervals between the light pulses of said pulse light source, said capacitor being charged to a substantially lower voltage than said supply voltage and discharged by way of said pulsed light source, a charging resistor connected between said capacitor and said rectifier, a thyristor connected in series with said pulsed light source and in parallel with said capacitor, said thyristor being controlled by the voltage across said capacitor, said light receiver being connected to said rectifier in series with said resistor and with said pulsed light source, and a Zener diode connected in parallel to said pulse amplifier.

2. A light barrier system according to claim 1, wherein said pulsed light source is a light emitting diode.

3. A light barrier system according to claim 2, wherein the diode is a GaAs diode.

4. A light barrier system according to claim 1, wherein the maximum charging voltage of said capacitor is from about 25 to about 35 volts.

5. A light barrier system according to claim 1, wherein said capacitor has a capacitance of from 0.2 to 0.8 $\mu$F and the charging resistor has a resistance value of from 30 to 80 k-ohms.

6. A light barrier system according to claim 1, wherein an inductance coil is connected in series with said capacitor.

7. A light barrier system according to claim 1, wherein a trigger diode is connected in a circuit in parallel to said capacitor, and wherein said thyristor has a control electrode connected to said trigger diode so that upon firing of the trigger diode said thyristor becomes effective.

8. A light barrier system according to claim 7, wherein a diac is inserted as trigger diode between the anode and the control electrode of the thyristor.

9. A light barrier system according to claim 8, wherein the control electrode is connected by way of a resistor to the anode of the pulsed light source.

10. A light barrier system according to claim 1, comprising a sawtooth generator which is controlled by the output pulses of said light receiver and connected to said indicator unit, the maximum voltage of said generator having a value which is insufficient to trigger said indicator unit under normal operation but exceeds said value as soon as the pulse height falls below a predetermined level because of an obstacle in said path.

11. A light barrier system according to claim 10, wherein said sawtooth generator comprises a second thyristor which is connected to said rectifier in series with a resistor and whose control electrode is connected to the output of said pulse amplifier, and a second capacitor connected in parallel to said second thyristor.

12. A light barrier system according to claim 11, wherein a third capacitor is interposed between said control electrode of said second thyristor and said output of said pulse amplifier.

13. A light barrier system according to claim 11, wherein the maximum voltage of said sawtooth generator operates a transistor serving as voltage detector.

14. A light barrier system according to claim 13, wherein a resistor is connected between said sawtooth capacitor and the point of connection on the cathode side to the sawtooth thyristor.

15. A light barrier system according to claim 14, comprising another resistor between the point of connection of said second capacitor and of said resistor connected thereto, and the control electrode of said second thyristor.

16. A light barrier system according to claim 11, wherein a rectifier diode is inserted in the direct connection between said Zener diode and said rectifier, said second thyristor being connected to the point of connection between said Zener diode and said rectifier diode and the resistor connected to the rectifier.

17. A light barrier system according to claim 1, comprising a transistor controlled by said light receiver and connected between said indicator unit and said rectifier.

* * * * *

UNITED STATES PATENT AND TRADEMARK OFFICE
CERTIFICATE OF CORRECTION

PATENT NO. : 4,012,635
DATED : March 15, 1977
INVENTOR(S) : ARTHUR WALTER et al

It is certified that error appears in the above-identified patent and that said Letters Patent are hereby corrected as shown below:

On the Title Page item [73] should read

[73] Assignee: Erwin Sick GmbH Optik-Electronik, Waldkirch, Germany

Signed and Sealed this ninth Day of August 1977

[SEAL]

*Attest:*

RUTH C. MASON
*Attesting Officer*

C. MARSHALL DANN
*Commissioner of Patents and Trademarks*